United States Patent [19]

Pettazzi

[11] Patent Number: 5,613,429
[45] Date of Patent: Mar. 25, 1997

[54] MACHINE FOR AUTOMATICALLY SHELLING FRESH EGGS

[75] Inventor: Gianluigi Pettazzi, Milan, Italy

[73] Assignee: FPS Food Processing Systems, B.V., Barneveld, Netherlands

[21] Appl. No.: 659,307

[22] Filed: Jun. 6, 1996

[30] Foreign Application Priority Data

Jun. 9, 1995 [IT] Italy .................... PN95A0032

[51] Int. Cl.$^6$ .................... A23J 1/09; A47J 43/14; A01K 43/00
[52] U.S. Cl. .................... 99/500; 99/497; 99/498
[58] Field of Search .................... 99/495–500, 568, 99/577–582; 426/299, 478–480, 490, 614

[56] References Cited

U.S. PATENT DOCUMENTS

| | | | |
|---|---|---|---|
| 3,589,419 | 6/1971 | Classen | 99/498 |
| 4,111,111 | 9/1978 | Willsey | 99/499 |
| 4,137,837 | 2/1979 | Warren | 426/490 X |
| 4,137,838 | 2/1979 | Warren | 99/500 |
| 4,321,864 | 3/1982 | Willsey | 99/500 |
| 4,534,284 | 8/1985 | Fujimura et al. | 99/498 |
| 4,541,330 | 9/1985 | Fujimura | 99/497 X |
| 4,799,423 | 1/1989 | Willsey | 99/500 |
| 5,085,139 | 2/1992 | Pellegrinelli | 99/500 |
| 5,293,815 | 3/1994 | Tomosue | 99/498 |
| 5,325,768 | 7/1994 | Hazel | 99/498 |
| 5,410,953 | 5/1995 | Yamashita | 99/498 X |
| 5,460,083 | 10/1995 | Hutchinson et al. | 99/484 |

*Primary Examiner*—Timothy F. Simone
*Attorney, Agent, or Firm*—Wenderoth, Lind & Ponack

[57] ABSTRACT

An automatic egg shelling machine has a plurality of operative lines that are arranged to be side-by-side and driven by a common drive motor. Each of the operative lines extends in a substantially vertical plane. The operative lines receive eggs from an egg feeding station, and are moved in conveyor fashion along a closed loop. A number of hinged compact groups are distributed along each one of the lines for receiving the eggs from the egg feeding station and breaking the shells of the eggs. The compact groups collect the yolk and the albumen thereof separately.

9 Claims, 4 Drawing Sheets

MACHINE FOR AUTOMATICALLY SHELLING FRESH EGGS

BACKGROUND OF THE INVENTION

The present invention relates to an automatic machine that is capable of breaking off and stripping the shell from fresh eggs that are supplied to it in sequence by a conveyor or similar means, as well as distinctly collecting the yolk and the albumen of each one of the eggs in view of the separate storage of the yolk and the albumen in appropriate containers.

Such machines are generally of a carrousel type, having a closed loop conveyor extending in a horizontal plane and carrying a plurality of compact operative groups, each one of which cyclically receives an egg from a feeder, breaks off the shell of the egg by means of a knife-type apparatus, and separately collects the yolk and the albumen thereof into respective appropriately sized cups placed on each other so that they can be conveyed into respective separate storage containers. In particular, in each compact operative group both the shell breaking means and the collecting cups are arranged above each other and aligned vertically. Machines of this kind are for instance described in U.S. Pat. No. 4,137,838 and U.S. Pat. No. 4,321,864.

In view of the desire to reduce the space requirements of such carrousel-like machines, automatic egg shelling machines have been proposed which have a plurality of continuous operative lines in a side-by-side arrangement, each line extending vertically. A machine of this kind is for example described in Italian patent A 1,223,181. In this document, each operative line is in turn formed by two separate closed-loop conveyors that are arranged above each other to extend on the same vertical plane. In particular, the upper conveyor carries a plurality of egg-shell breaking apparatuses, whereas the lower conveyor carries a plurality of groups for separately collecting the yolks and the albumens of the eggs.

The solution of the Italian patent enables an output capacity to be reached that is certainly greater than that of the carrousel-type machines. However, this solution still has some drawbacks:

In particular, in each operative line, the movement of the two conveyors running one above the other must be accurately synchronized so as to enable the contents of the eggs that are supported and shelled at the corresponding upper conveyor to be correctly collected on the front portion of the machine in correspondence with the lower conveyor. This involves undesirable complications of the machine from both the point of view of its construction as well as its function.

Furthermore, because sanitary regulations call for the egg yolks and the albumens collected in the lower conveyors to be regularly inspected, a need arises for the lower conveyors to extend horizontally beyond the corresponding upper conveyors. Because of this, the whole machine is under definite shape and size constraints, particularly lengthwise, that prevent the machine from being compact to any satisfactory extent.

The above-discussed displacement of the conveyors with respect to each other does not allow for an adequate inspection to be carried out of both the shells of the eggs in the upper conveyors and their contents on the lower conveyors by a single operator at the same time. This of course makes it quite difficult, and critical, to operate and use the machine under the highest possible sanitary safety conditions. In any case, an operator inspecting the collecting portion is quite likely to fail to take notice of eggs that may possibly remain unshelled, i.e. not broken, due to a malfunction. This results in the unshelled eggs being sent directly to discharge, resulting in a reduced production yield and reduced efficiency of the machine.

The broken shells are intended to fall and collect in a screw-type discharge channel similar to a gutter that is arranged at the base of the upper conveyors in correspondence with an end portion (return point) beyond which the lower conveyors extend. Therefore during translation of the broken shells along the upper conveyors, filamentous dripping of the albumen may occur, which settles on the edge of the gutter-like channel. As a result, subsequently a substantially continuous filiform fall of albumen occurs from the channel. Should one of the shelled eggs turn out to be of a non-edible quality, the dripping albumen from this egg can progressively contaminate the discharge channel, the collecting means carried on the conveyors under the discharge channel and the product collected thereby. The consequences of such a process are clearly apparent.

Similar contamination problems can arise from the various reservoirs in which the edible product (yolk, albumen and mixed product) is stored, since they are situated downstream of reservoirs used to store the non-edible product, i.e. the product that is unfit for food. In fact, should the product contained in the collecting means be found to be non-edible, the same collecting means is actuated by an operator to cause it to discharge the product into the appropriately provided storage reservoir. It is therefore practically impossible to prevent dripping of the non-edible product from taking place at the subsequent storage reservoirs, where they eventually contaminate the contents. The problem is particularly noted with respect to the reservoir where the yolks are stored, because this reservoir is generally arranged at the rear end portion of the machine on the outside of the operative lines, i.e. at a position at which the direction of movement of the lower conveyors is reversed and, as a result, dripping is more likely to occur. On the other hand, the relative arrangement of the various storage reservoirs is necessary in order to provide sufficient space for the operator to conveniently inspect the product which is carried by the collecting means without any need arising for the space that is occupied by the machine in the lengthwise direction to be further increased.

Some of the more delicate yolks can undesirably rupture when falling from a shell-breaking apparatus down to the respective collecting means providing therebelow. This drawback is common to carrousel-type egg shelling machines provided with compact shell-breaking and collecting means, because the shortest possible yolk-falling height is usually determined by geometric and/or size constraints. The practical result is a substantial drop in the efficiency of such machines.

SUMMARY OF THE INVENTION

It is therefore a primary object of the present invention to provide an automatic machine for shelling fresh eggs in which the typical drawbacks associated with prior art machines are eliminated or minimized. In particular, it is an object of the present invention to provide an automatic egg shelling machine that is particularly compact and simple in its structural arrangement but yet is capable of operating in a simple reliable manner with a high degree of efficiency.

A further object of the present invention is to provide a machine that is generally capable of operating under stringent safety and hygiene conditions.

In accordance with the present invention, the abovestated objects are accomplished by a machine for automatically shelling fresh eggs that comprises an egg feeding station, a plurality of operative conveyor lines that are arranged side-by-side and are adapted to receive eggs from the egg feeding station, each of the operative conveyor lines comprising a single closed-loop conveyor and extending in a substantially vertical plane, a drive means for driving each of the plurality of operative conveyor lines along its respective single closed-loop, and a plurality of compact groups distributed along each of the plurality of operative conveyor lines for breaking the shells of the eggs received from the egg feeding station and separately collecting the yolk and the albumen of the eggs.

Preferably, the machine according to the present invention has each of the compact groups comprising a collecting apparatus that comprises a yolk collecting pan located above an albumen collecting cup and a shell breaking apparatus that is arranged above the collecting apparatus. The collecting apparatus is at a position offset relative to the shell breaking apparatus in a direction away from the egg feeding station.

The yolk collecting pan preferably has an inclined chute that protrudes in a direction toward the egg feeding station and extends along a vertical line that passes through the shell breaking apparatus as well as adjacent to the vertical line, so that the contents of an egg falling from the shell breaking apparatus is collected by the inclined chute and guided to the pan and subsequently to the albumen collecting cup.

A plurality of reservoirs for the differentiated storage of albumen, yolk, mixed albumen and yolk, and non-food grade product from the compact groups is provided inside the plurality of closed-loops. The reservoirs are substantially horizontally aligned with each other. One of the reservoirs stores the non-food grade product therein, and is located downstream of the other reservoirs with respect to the direction of travel of the single closed-loop conveyors. A chute having a screw conveyor for collecting an discharging broken egg shells, further, is located within the closed-loops form by the plurality of operative conveyor lines.

Each of the compact groups is preferably pivotably mounted to one of the plurality of conveyor lines. The yolk collecting pan is pivotably mounted on a vertical line that is further away from the egg feeding station than a center line of the egg breaking apparatus, furthermore. The egg breaking apparatus and the collecting apparatus in each compact group are mounted on a common support, furthermore, that is pivoted to one of the plurality of operative conveyor lines.

BRIEF DESCRIPTION OF THE DRAWINGS

Further characteristics and advantages of the present invention will be more clearly understood from the following description, provided by way of example and not in a limiting sense, and with reference to the accompanying drawings, in which.

DETAILED DESCRIPTION OF THE PREFERRED EMBODIMENTS

Figure 1:
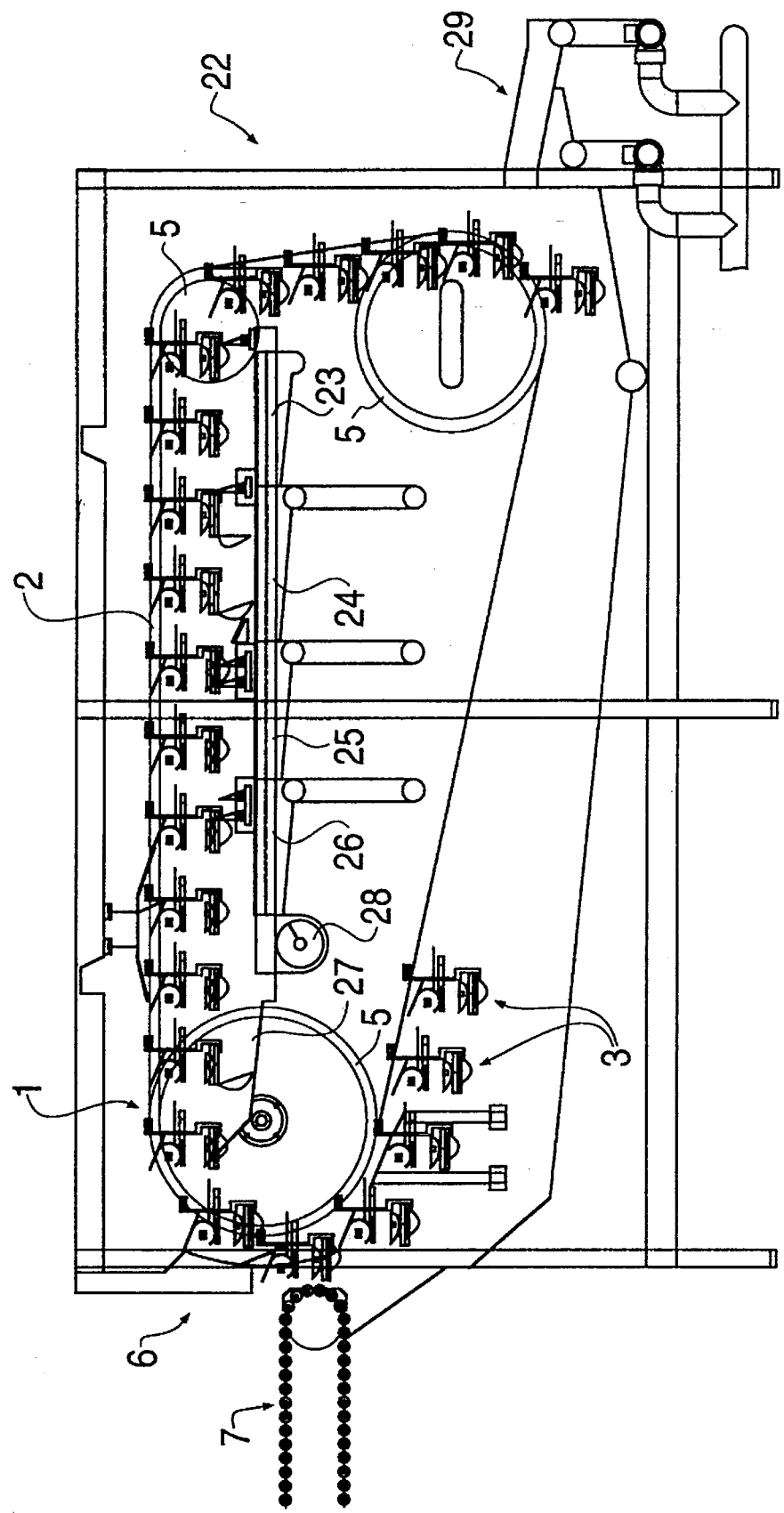
FIG. 1 is a schematic side view of an egg shelling machine according to the present invention, illustrating only the most significant component parts of the machine.

Referring to the drawing figures, an egg shelling machine according to the present invention comprises a plurality of operative lines 1 that are provided in a side-by-side arrangement. One such operative line 1 is seen from the side in FIG. 1. Each operative line is, for example, formed by a closed-loop conveyor chain 2 that extends in a substantially vertical plane and is mounted on appropriate reversing rollers 5 together with a suitable guide system. The closed loop chain 2 is driven by a motor driving means 4 such as an electric motor. A plurality of compact groups 3 are freely hinged onto the chain 2 in each operative line, for carrying the eggs, breaking the shell of the eggs and collecting the yolk and the albumen separately.

Figure 2:
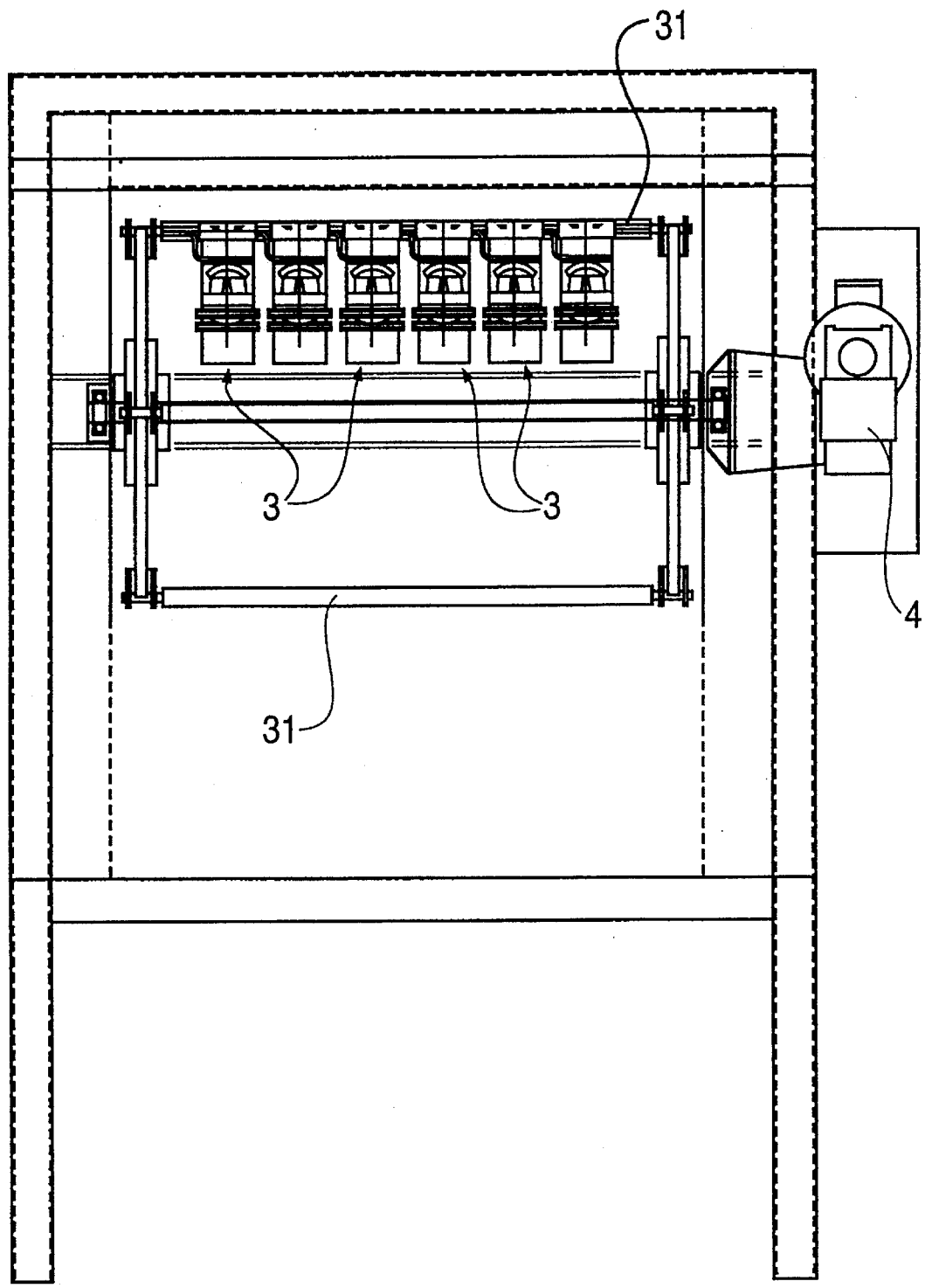
FIG. 2 is a rear view of the machine illustrated in FIG. 1, with some component parts being omitted for the sake of clarity.

As can be seen in FIG. 1, each operative line 1 extends to form a single closed-loop configuration, along which the compact groups 3 are distributed. Accordingly, as will become further apparent, the entire machine has a simple, compact and rational structure. In a per se known manner, the operative lines in the side-by-side arrangement are preferably interconnected by means of appropriate cross-beams 31 as seen in FIG. 2, and are caused to progress simultaneously at the same pace.

The machine has a front end portion 6 adjacent to which is provided a roller-type or similar feeding apparatus 7 that is adapted to convey fresh eggs in sequence toward the grooves 3.

Figure 3:
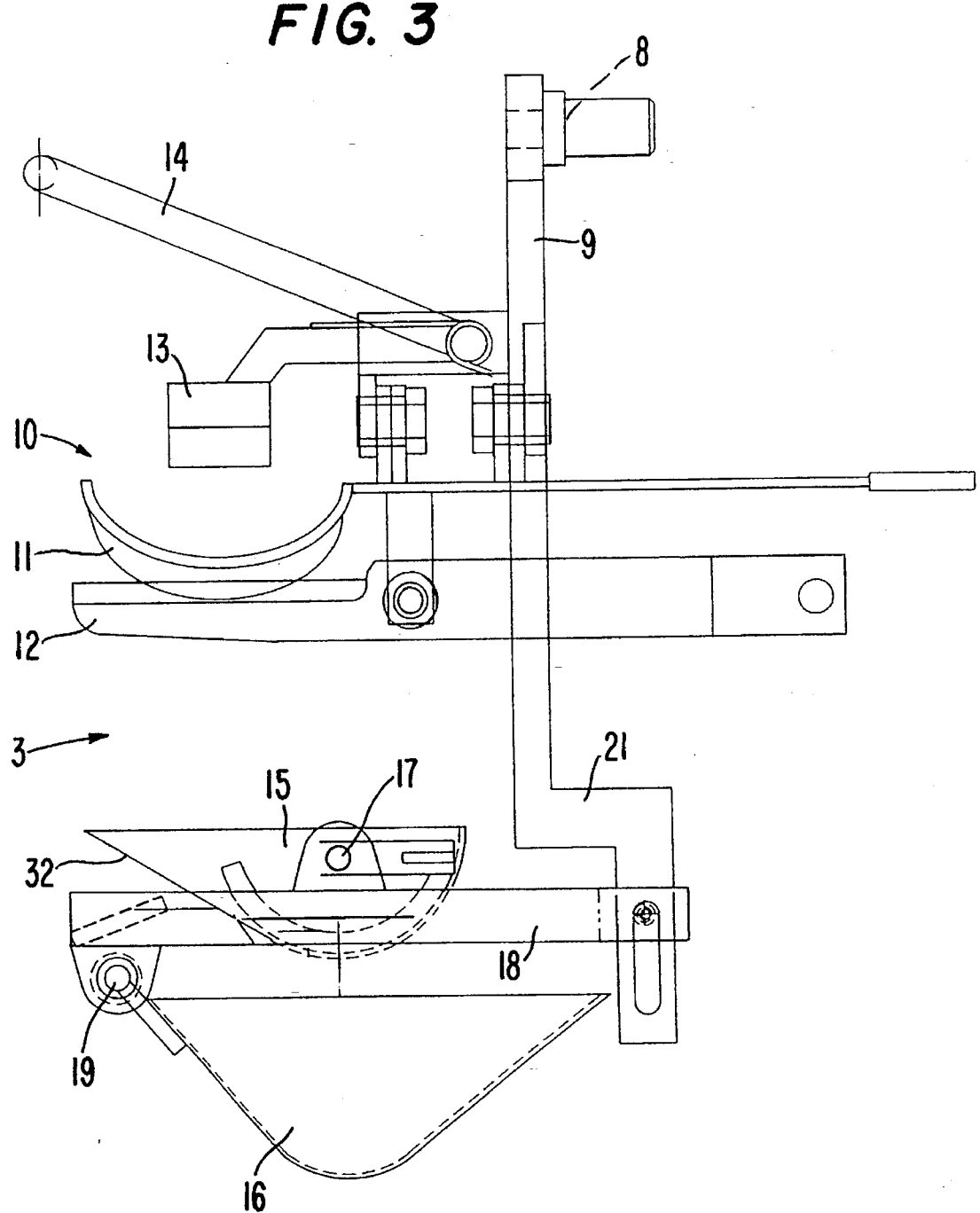
FIG. 3 is a schematic side view of a detail of the machine illustrated in FIG. 1 according to a preferred embodiment of the present invention.
Figure 4:
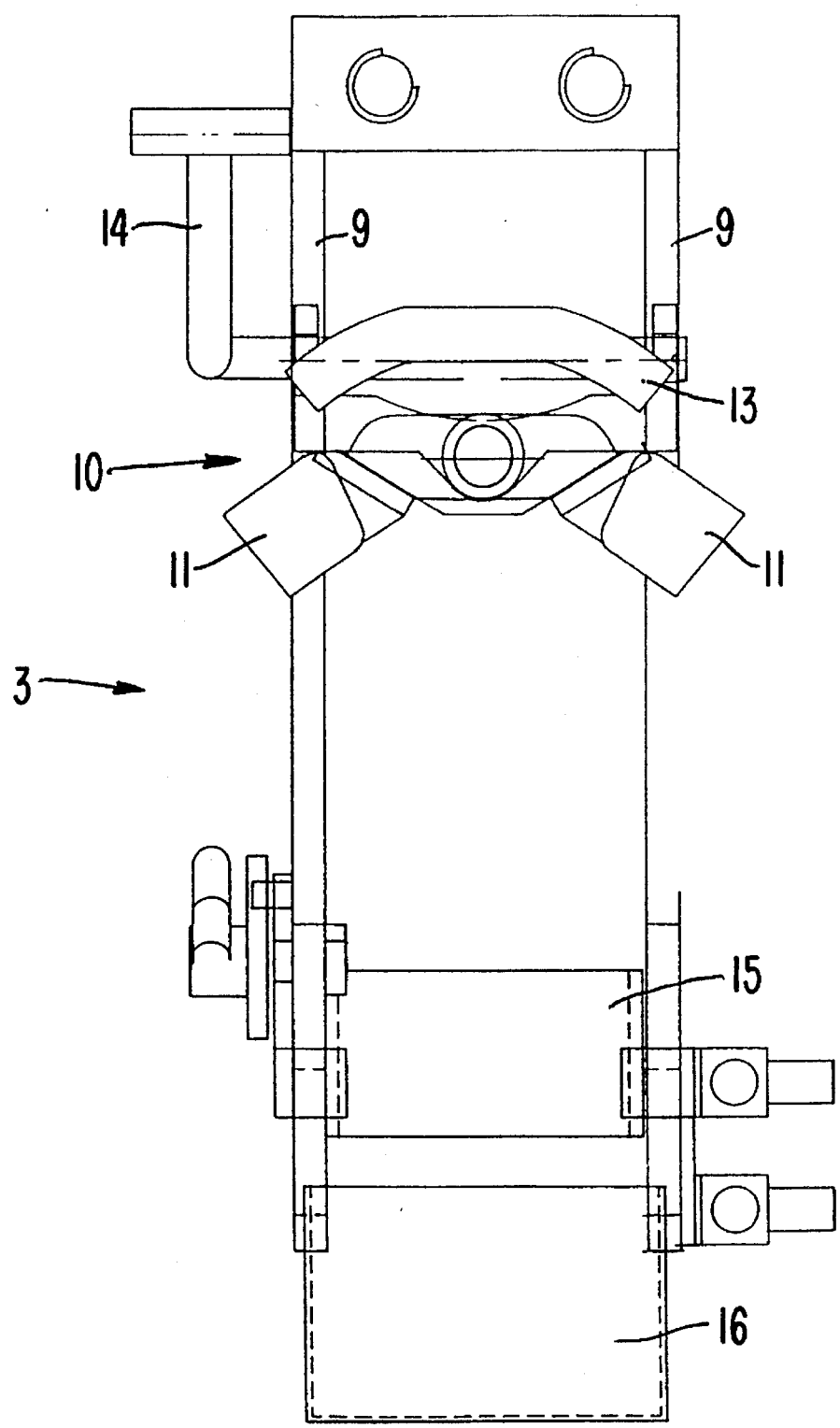
FIG. 4 is a schematic front view of the detail illustrated in FIG. 3.

As shown particularly in FIGS. 3 and 4, each one of the groups 3 is hinged on a respective chain 2 at an upper point 8. From the upper point 8, a pair of bars 9 carrying a shell-breaking apparatus 10 extend downward. In a per se known manner, as described for example in U.S. Pat. No. 4,321,864 (incorporated herein by reference), the shell breaking apparatus 10 comprises in turn two support jaws 11 that are provided in a side-by-side arrangement and are capable of being moved apart. Between the two support jaws 11 is provided an apparatus 12 that is hinged in a knife-like configuration to the two support jaws 11. Above the jaws 11 is hinged a retaining arm 13 that is associated with an actuating lever 14.

Below the shell-breaking apparatus 10, each compact group 3 is further provided with a collecting apparatus that comprises a pan 15 and a cup 16 for collecting the yolk and the albumen, respectively. In particular, the pan 15 and the cup 16 are substantially vertically aligned in a rearward position with respect to the shell-breaking apparatus 10. In particular, an inclined chute 32 that extends along the vertical line that passes through the shell-breaking apparatus 10 protrudes frontally from the pan 15. The pan 15 is hinged centrally at 17 so as to be able to be normally maintained in a horizontal position. The pan 15 is hinged onto at least a longitudinal cross-beam 18. The cup 16 is also hinged to the longitudinal cross-beam 18, for example at the front of the cup 16 as illustrated at 19 in FIG. 3.

In a per se known manner, the cup 16 is also normally maintained in a horizontal position, and each collecting apparatus 15, 16 is associated with linkages (not shown for greater simplicity) that can be actuated into various positions so as to selectively allow for the yolk and the albumen to be unloaded separately, jointly, or into a waste collecting container in case of a non-edible or non-food quality product.

The cross-beam 18 is mounted on the rear side on a bracket 21 that extends rearwardly from the lower end portion of the bars 9.

The structure of the groups 3 turns out to be particularly compact with the present invention, and to such an extent so as to allow for the chute 32 to be positioned close to the shell-breaking apparatus 10, relative to which the entire product collecting apparatus 15, 16 is advantageously displaced backwards. In this regard, it should be noted that when the operative lines 1 are in motion, each compact group 3 must move along with the front end portions of the jaws 11 running flush with the feeding apparatus, i.e. coming into the closest possible relation therewith, so as to ensure a safe transfer of the fresh eggs from the feeding apparatus to the compact groups 3. This would not be possible in the case of compact groups of the traditional type, i.e. with shell-breaking apparatus and collecting apparatus arranged above each other on the same vertical line. As a matter of fact, the pan 15 and the cup 16 must have horizontal dimensions that are larger than the jaws 11 of the shell-breaking apparatus so as to be able to collect the liquid contents of the shelled eggs without any spillage. As a result, in a machine according to the present invention in which the operative lines 1 are arranged in a single vertical closed-loop configuration, it would be practically impossible to move the groups 3 so as to enable the jaws 11 to skim, i.e. to correctly come close to the feeding apparatus 7. This could theoretically be achieved by providing the jaws 11 with front protrusions that are adapted to receive the still sound eggs and rotate them into a proper shell-breaking position. In practice, however, such a solution is impractical because it results in an unstable state of the eggs as they are rotated, thus resulting in substantial ineffectiveness of the machine along with the undesired oversizing of the compact groups. Quite to the contrary, according to a feature of the present invention, such problems are solved in a simple and effective manner thanks to the aforementioned rearward offset position of the collecting apparatuses 15, 16 (which eliminates the geometrical interference) and the presence of the chutes 32 (which enable the liquid content of the broken eggs to be collected optimally without taking up any substantial space vertically).

It should be further noted that in each compact group 3, the chute 32 lying close to the shell-breaking apparatus 10 is capable of very delicately collecting and transferring the liquid content of the broken eggs from the shell-breaking apparatus 10 to the separate collecting means 15, 16. In this manner, most delicate egg yolks can also be collected without any risk of rupture.

In a preferred manner, the closed-loop configurations formed by the operative lines 1 have a horizontally elongated arrangement, while reservoirs are provided inside the closed-loop configurations in a substantially horizontally aligned arrangement for differentiated storage of the product. In particular, starting from the rear end portion 22, through to the front end portion 6 of the machine, there are successively provided a reservoir 23 for the storage of albumen, a reservoir 24 for the storage of the yolk, a reservoir 25 for the storage of mixed product, a reservoir 26 for the storage of non-edible or non-food quality product, as well as (preferably downstream of all such reservoirs) an arrangement 27 for washing the compact groups 3. In a preferred manner, a screw-type discharge chute 28, of a per se known type, is provided between the washing arrangement 27 and the reservoir 26 in order to collect and discharge the broken shells of the eggs.

With respect to the rear end portion 22, the machine further comprises a tank or a similar vessel 29 for the inspection of the stored albumen.

The egg shelling machine according to the present invention is of course completed by the provision of appropriate mechanisms for time-controlled operation thereof and for the resetting of compact groups 3. Such mechanisms are, for example, of the type comprising cams and associated position checks. Additionally, the machine may comprise mechanisms to drive the screw 28, the washing apparatus 27, etc. Also such mechanisms may be of any type that fulfills the desired purpose, such as those described in the aforementioned prior patent specification. For greater simplicity and ease of understanding, they will not be specifically described here.

From the above description, the manner in which the egg shelling machine generally operates can be inferred quite clearly, so that there is little point in explaining the details of the operation here. Only the most significant aspects of the operation will thus be briefly described below.

With reference to FIG. 1, it can be seen that each one of the side-by-side operative lines 1 is driven in a counter-clockwise direction, and each group 3 moves along in sequence by the feeding arrangement 7 to pick up a fresh egg with the jaws 11. The shell of the egg is then broken through a jerking movement of the knife-like apparatus 12. The two halves of the broken shell are parted from each other by a movement of the jaws 11; the jaws 11 open apart so as to enable the liquid content of the egg to fall down by gravity from the shell-breaking apparatus 10. The liquid content, or liquid product, is collected by the chute 32 thereunder, which conveys it delicately toward the pan 15, where the yolk is collected. In a per se known manner, the albumen separates by gravity from the yolk and falls into the cup 16 thereunder.

Because of the operative lines 1 being provided along individual vertically extending closed loops supporting the compact groups 3, during the translational movement of the operative lines 1, an operator (who is preferably standing at the rear end portion 22 of the machine) can conveniently inspect not only the product contained in the collecting apparatuses 15 and 16, but also the possible presence of unbroken eggs at the shell breaking apparatuses 10. At this position the operator is able to intervene in the most appropriate manner.

In a per se known manner, the operator will act on appropriate levers according to the particular need. As a result, at the upper portion of the machine the pans 15 and the cups 16 are normally "released" to pour their respective contents into the storage reservoirs in a differentiated manner. In particular, the albumen in the cup 16 is poured into the reservoir 23, and the yolk in the pan 15 is poured into the reservoir 24. Alternatively, both products may be poured into the same reservoir 25, provided for storing a mixed product.

Should the operator discover that the product collected by the apparatuses 15, 16 is not fit for human consumption, i.e. not suitable for food applications, the operator intervenes (by respective levers, e.g.) so as to cause the apparatuses 15 and 16 to be operated so that they will pour their contents into the reservoir 26. Due to the fact that the reservoir 26 is arranged downstream of the other storage reservoirs (as well as upstream of the washing arrangement 27), there is practically no possibility for non-food quality product to drip accidentally into the storage reservoirs 23, 24 and 25, where it could clearly contaminate the food-quality edible contents thereof. The hygienic safety conditions are further enhanced by the side-by-side arrangement of the reservoirs within the operative lines 1, i.e. in positions in which the compact groups 3 are not subject to any particular undesired vibration.

The relative arrangement of the various operative components of the machine as described above is such as to prevent any filamentary accumulation of albumen from forming on the borders of the screw-type chute 28. Thus no undesired spilling of the product which could possibly contaminate the contents of the underlying company groups 3 can take place. In a per se known manner, the chute 28 collects and discharges the broken shells as they are released from the shell breaking apparatuses 10.

Each cycle of operation is completed by, possibly, washing and resetting the compact groups 3, which again come to pass by the feeding apparatus 7 under appropriate conditions of cleanliness and in a correct position.

It will be appreciated that the above-described egg shelling machine can be subject to a number of modifications without departing from the scope of the present invention.

I claim:

1. A machine for automatically shelling fresh eggs, comprising:

an egg feeding station;

a plurality of operative conveyor lines that are arranged side-by-side and are adapted to receive eggs from said egg feeding station, each of said plurality of operative conveyor lines comprising a single conveyor in a closed-loop and extending in a substantially vertical plane;

a drive means for driving each of said plurality of operative conveyor lines along its respective said single closed-loop; and a plurality of compact groups distributed along each of said plurality of operative conveyor lines for breaking the shells of the eggs received from said egg feeding station and separately collecting the yolk and the albumen of the eggs.

2. The machine of claim 1, wherein each one of said compact groups comprises:

a collecting apparatus comprising a yolk collecting pan located above an albumen collecting cup; and a shell breaking apparatus arranged above said collecting apparatus;

wherein said collecting apparatus is at a position offset relative to said shell breaking apparatus in a direction away from said egg feeding station.

3. The machine of claim 2, wherein said yolk collecting pan has an inclined chute protruding in a direction toward said egg feeding station and extending along a vertical line that passes through said shell breaking apparatus and adjacent to the vertical line such that the contents of an egg falling from said shell-breaking apparatus is collected by said inclined chute and guided to said pan and subsequently to said albumen collecting cup.

4. The machine of claim 1, and further comprising a plurality of reservoirs for the differentiated storage of albumen, yolk, mixed albumen and yolk, and non-food grade product from said compact groups, wherein said plurality of reservoirs are substantially horizontally aligned with each other and located at a position within said closed-loops formed by said plurality of operative conveyor lines.

5. The machine of claim 4, wherein said plurality of operative conveyor lines have a direction of travel about said closed-loops, one of said plurality of reservoirs stores the non-food grade product therein, and said one of said plurality of reservoirs is located downstream of the others of said plurality of reservoirs with respect to the direction of travel.

6. The machine of claim 5, and further comprising a chute having a screw conveyor for collecting and discharging broken egg shells, said chute being located within said closed loops formed by said plurality of operative conveyor lines.

7. The machine of claim 1, wherein each of said compact groups is pivotably mounted to one of said plurality of conveyor lines.

8. The machine of claim 2, wherein in each one of said compact groups, said yolk collecting pan is pivotably mounted on a vertical line that is further away from said egg feeding station than a centerline of said egg breaking apparatus.

9. The machine of claim 8, wherein said egg breaking apparatus and said collecting apparatus in each one of said compact groups are mounted on a common support pivoted to one of said plurality of operative conveyor lines.

* * * * *